United States Patent [19]
Pollmeier

[11] 4,100,595
[45] Jul. 11, 1978

[54] CIRCUIT FOR THE PRODUCTION OF AN OUTPUT VOLTAGE DEPENDING ON AN INPUT DIRECT VOLTAGE AND A GIVEN DESIRED VOLTAGE

[75] Inventor: Werner Pollmeier, Verl, Fed. Rep. of Germany

[73] Assignee: Nisdorf Computer AG, Paderborn, Fed. Rep. of Germany

[21] Appl. No.: 744,512

[22] Filed: Nov. 24, 1976

[30] Foreign Application Priority Data

Dec. 5, 1975 [DE] Fed. Rep. of Germany ....... 2554825

[51] Int. Cl.² ........................................... H02M 3/335
[52] U.S. Cl. .............................. 363/133; 323/DIG. 1; 363/25; 363/124
[58] Field of Search ............. 323/17, DIG. 1; 363/15, 363/16, 17, 24, 25, 26, 89, 90, 97, 124, 133, 134

[56] References Cited

U.S. PATENT DOCUMENTS

| 3,365,650 | 1/1968 | Camp et al. ............................. 363/97 |
| 3,378,752 | 4/1968 | Naylor ................................ 363/97 X |
| 3,969,652 | 7/1976 | Herzog ........................... 323/DIG. 1 |

OTHER PUBLICATIONS

Hoffman, "Switching Regulator Having Ripple Compensation by Current Insertion in Transformer Primary", IBM TDB, vol. 18, No. 9, Feb. 1976, pp. 2927, 2928.

Beesley, "Push-Push Power Inverter", IBM TDB, vol. 18, No. 11, Apr. 1976, p. 3736.

*Primary Examiner*—A. D. Pellinen
*Attorney, Agent, or Firm*—Blanchard, Flynn, Thiel, Boutell & Tanis

[57] ABSTRACT

A circuit for the production of an output voltage generated based upon an input direct voltage and a given desired voltage. A series connection comprises a longitudinal regulating member, an inductor and a push-pull current transformer which produces the output voltage. The input direct voltage is fed to the push-pull current transformer. The push-pull current transformer includes a push-pull transformer having push-pull primary winding and a secondary winding. In addition, the push-pull current transformer includes switching transistors which are switched on and off in push-pull by a control circuit. The control circuit delivers a suitable cyclical changing control signal to the switching transistors. Circuitry is provided for minimizing if not eliminating spikes in the current occurring during a switching of the switching transistors. As a result, the switching transistors remain free from excessive voltages which can damage same.

5 Claims, 3 Drawing Figures

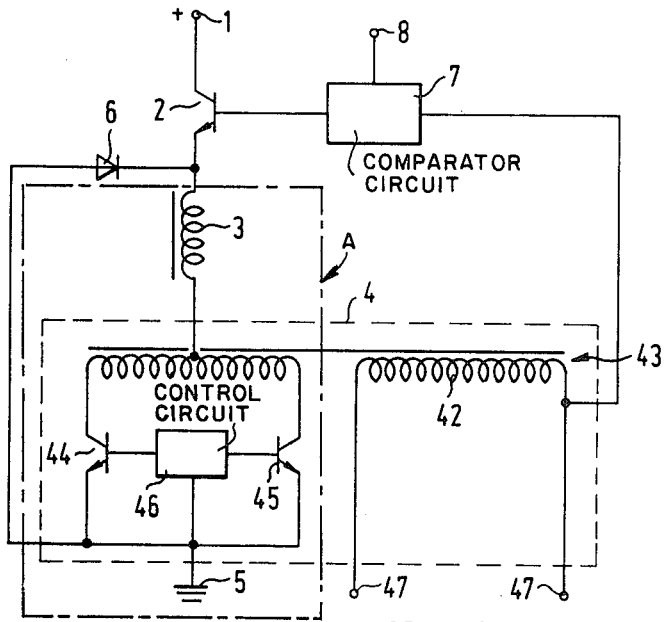
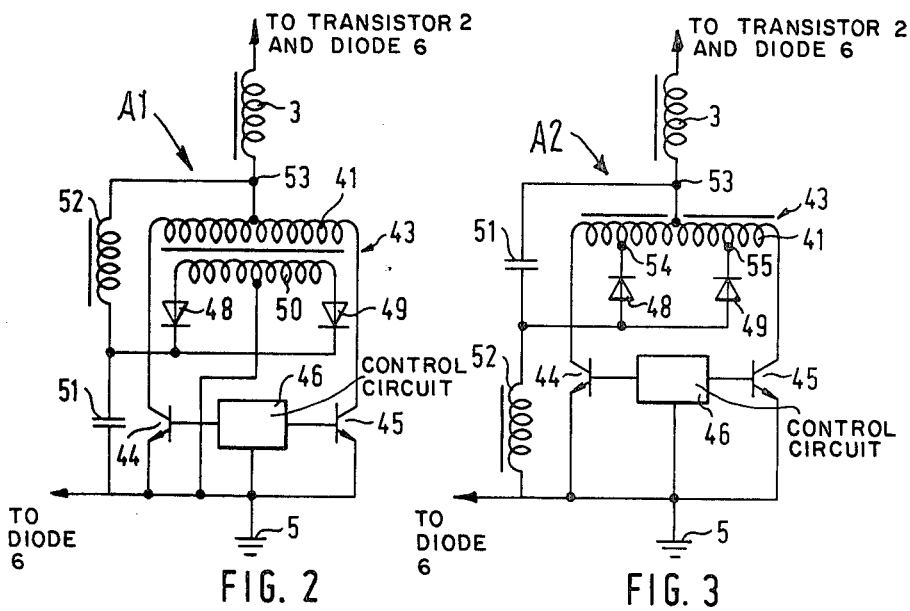
FIG. 1 PRIOR ART
FIG. 2
FIG. 3

CIRCUIT FOR THE PRODUCTION OF AN OUTPUT VOLTAGE DEPENDING ON AN INPUT DIRECT VOLTAGE AND A GIVEN DESIRED VOLTAGE

FIELD OF THE INVENTION

The invention relates to a circuit for the production of an output voltage depending on an input direct voltage and a given desired voltage having a series connection comprising a longitudinal regulating member, an inductor and a push-pull current transformer which produces an output voltage, and which is fed with the input direct voltage wherein the inductor and the push-pull current transformer are bridged by a diode, which is loaded at inductive cut-off voltages in pass direction.

BACKGROUND OF THE INVENTION

A circuit of this type can be used for example in power supply units and permits the production of stabilized output voltages, which are galvanically decoupled through the use of a push-pull current transformer with respect to the input direct voltage. It is now possible to operate such a circuit so that the feed of the electric output produced by the longitudinal regulating member occurs in the push-pull current transformer according to the principal of a current source feed. This means that at the feed point of the push-pull current transformer a capacitive energy storage does not occur so that the longitudinal regulating member does not have the characteristics of a voltage source with respect to the push-pull current transformer but instead has the characteristic of a current source. Through this principal it is possible to prevent the switch elements which exist in the push-pull current transformer from being destroyed by uncontrolled peak currents during short circuits, saturation of the push-pull transformer or overlapping operation. However, in spite of this, a certain danger of destroying the switch elements is still existent in the push-pull current transformer when, due to the current-sourcelike feed at the push-pull current transformer, inductive cut-off voltages of uncertain value, caused by the leakage inductance of a transformer which is provided in the current transformer, are created which are so high that they cause a destruction of the switch elements, for example of the transistor switches.

It is now possible to avoid also these disadvantages by connecting in parallel with the push-pull current transformer a RC-member in association with a diode in order to limit possibly occurring excessive voltages to nondamaging values. A current which is produced through such voltages is thereby bled away through the RC-member. However, it has been noted that in the ohmic resistance of the RC-member a very high output is consumed, which occurs when particularly very large leakage inductance exists in the push-pull transformer. In particular, the leakage inductance of the push-pull transformer determines this loss output very substantially because the time, during which a voltage superelevation can occur at the push-pull transformer, is determined by this leakage inductance and this time in turn determines the center current flow in the ohmic resistance of the RC-member. If such a circuit is, for example, used in a cycled current source in which exists an unstabilized direct voltage of 200 volts, a frequency of 30 kHz., a switch current of 4 amps and a leakage inductance of the push-pull transformer of 40 Micro-H., then it is already possible at a still permitted excessive voltage of 10% of the mentioned direct voltage for the loss output in the ohmic resistance of the RC-member to reach a value of more than 200 watts.

The purpose of the invention is to provide an improved solution for the protection of the push-pull current transformer with respect to uncontrolled excessive voltages through which the loss output is substantially reduced on switch elements which are to be additionally inserted.

A circuit of the abovementioned type is constructed to solve this purpose inventively so that the push-pull current transformer is bridged, if necessary, together with an inductor by a series connection of an impedance coil and a capacitor and that voltages which are symmetrically derived from its push-pull transformer are conducted each through a diode to the capacitor.

Through the invention, it is possible to dimension the voltages which are derived symmetrically from the push-pull transformer so that upon occurrence of an excessive voltage at the push-pull transformer, the respective diode receives a change of its switching condition which causes a current to flow to a connecting point between the capacitor and the impedance coil. However, through this in turn a voltage limitation is caused because through the respectively conducting diode there exists at the points of the push-pull transformer, at which the auxiliary voltages are derived symmetrically, practically the voltage which exists also at the connecting point between the capacitor and the impedance coil. Since these two elements are connected in parallel with the push-pull current transformer, in a very simple manner this connecting point can conduct the voltage of the feed point of the push-pull current transformer, so that a superelevated voltage can practically no longer occur at the push-pull transformer. Furthermore with this is associated the advantage that the pulsating currents which flow through the two diodes are smoothened by the capacitor and, due to the connection to the feed point, are returned to same so that a power loss practically no longer occurs.

A further development of the invention is characterized by the push-pull transformer being provided with an additional push-pull winding preferably in a fixed coupling. The ends of the winding are connected through the diodes to the connecting point of the capacitor and the impedance coil which is connected to the inductor. In this embodiment, the two partial windings of the additional push-pull winding can be dimensioned in such a manner that the voltage occurring on them corresponds exactly with the center voltage, which occurs at the feed point of the push-pull current transformer. If the impedance coil is connected directly to the inductor which is connected in front of the push-pull current transformer, then this center feed voltage controls, through the impedance coil, also the capacitor so that in the case of voltage superelevations through the diodes and the impedance coil, the described feeding back of the currents caused by the voltage super-elevation is possible. The fixed coupling is advantageously provided in order to cover with the additional push-pull winding as much as possible the entire leakage inductance of the push-pull transformer.

In the aforedescribed embodiment it is advantageous to connect the impedance coil directly to the inductor which connection is connected to the push-pull transformer, which results in a particularly small waviness of the current in the impedance coil. However, it is also possible to connect the impedance coil to the other end of the inductor, however, hereby the current waviness in the impedance coil is greater.

A further development of the invention is characterized by the push-pull transformer having at its primary winding, which feeds the associated switch elements, taps, which are connected through the diodes to the connecting point between the capacitor connected to the inductor and the impedance coil. In this embodiment an additional push-pull winding is not needed, but the taps of the secondary winding of the push-pull transformer are placed in such a manner that the center feed voltage occurs thereat. If the capacitor is hereby connected to the inductor, which is connected in front of the push-pull current transformer, then in the case of voltage elevations, also pulsating currents flow through the two diodes, which currents are returned to the feed point of the push-pull current transformer and are smoothened by the series connection of the capacitor with the impedance coil.

BRIEF DESCRIPTION OF THE DRAWING

The invention will be described hereinafter in connection with the drawing, in which:

FIG. 1 illustrates a basic circuit diagram for the emission of an output voltage depending on an input direct voltage, which consists substantially of a longitudinal regulating member and a push-pull current transformer which is connected in series with said longitudinal regulating member, FIG. 2 illustrates a first exemplary embodiment of the invention on the push-pull current transformer which is shown in FIG. 1, and FIG. 3 illustrates a second exemplary embodiment of the invention on the push-pull current transformer which is shown in FIG. 1.

DETAILED DESCRIPTION

FIG. 1 illustrates a circuit for the emission of an output voltage depending on an input direct voltage and a given desired voltage. This circuit comprises a series connection of a longitudinal regulating member in the form of a transistor 2, an inductor 3 and a push-pull current transformer 4 connected to the positive operating voltage terminal 1. The push-pull current transformer 4 includes a push-pull transformer 43 having a push-pull primary winding 41 and a secondary winding 42. The inductor 3 is connected to a center tap on the winding 41. The push-pull current transformer 4 further includes as switching elements switching transistors 44 and 45, which are switched on and off in push-pull by means of a control circuit 46. For this the control circuit 46 delivers a suitable, cyclically changing control signal to the base electrodes of the two switching transistors 44 and 45. The emitter electrodes of the two transistors 44 and 45 are connected to the ground 5 and the control circuit is also grounded. The collector electrodes are each connected to opposite ends of the primary winding 41. A diode 6 is connected in parallel with a circuit A, namely, the series connection of inductor 3 and push-pull current transformer 4 through to the ground 5. The diode is poled so that it discharges the inductor 3 during the control breaks of the arrangement and bleeds away inductive cut-off voltages which occur at the inductor 3 thereby protecting the transistor 2. A secondary voltage can be removed at the connections 47 from the secondary winding, which if necessary after rectification can be utilized as a supply voltage which is galvanically decoupled with respect to the input voltage to the various consumers. One terminal of the secondary winding 42 is connected to a comparator circuit 7 having a reference voltage connected to a further control input terminal 8. Based on any deviation occurring between the secondary voltage at the connection 47 and the reference voltage at the control input terminal 8, the comparator circuit produces a control signal at its output which is connected to the base electrode of the transistor 2 to control the current flow to the inductor 3 to produce a constant output voltage at the output connections 47 of the push-pull current transformer.

The circuit shown in FIG. 1 contains, as a current source for the push-pull current transformer 4, an arrangement which is formed of the transistor 2 and the inductor 3 and produce the effect of a current source at the feed point of the push-pull current transformer. However, with this principal very high voltages can occur at the push-pull transformer 43, which are caused by the control inductivity of the transformer windings 41/42 during switching over of the two switching transistors 44 and 45. It is therefore necessary to limit such excessive voltages which occur at the push-pull transformer 43 to a value which is nondamaging to the switching transistors 44 and 45.

A circuit A1 which is suitable for limiting excessive voltages is shown in FIG. 2 and is to be substituted for the circuit A of FIG. 1. Only a portion of the circuit comprising the primary winding 41 of the push-pull transformer 43 (FIG. 1) and the associated switching transistors 44 and 45 and the control circuit 46 and the inductor 3 is illustrated. In addition a push-pull secondary winding 50 having a center tap is provided. The center tap of the winding 50 is connected to ground potential at 5 while the two winding ends thereof are connected through diodes 48 and 49 to a connecting point between a capacitor 51 and an impedance coil 52. The capacitor and impedance coil are series connected in parallel with the push-pull current transformer and between the inductor 3 and ground 5. In the exemplary embodiment which is illustrated in FIG. 2, the impedance coil 52 is connected to a feed point 53 of the push-pull current transformer and to the center tap of the primary winding 41.

If uncontrolled excessive voltages occur at the push-pull transformer, then a corresponding voltage change takes place at the secondary winding 50. If the secondary winding 50 is dimensioned in such a manner that the voltages which occur on it correspond exactly with the center feed voltage occurring at the feed point 53, then current flow does not take place over the diodes 48 and 49 because of the connection of the capacitor 51 which conducts precisely this center feed voltage of the feed point 53 through the impedance coil 52. However, if excessive voltages occur at the push-pull windings 50, then the diodes become conductive, and a current flow occurs from the two end connections of the push-pull winding 50 to the connecting point between the capacitor 51 and impedance coil 52. This current flow is returned through the impedance coil 52 to the feed point 53, namely due to the series connection of capacitor 51 and impedance coil 52, in smoothened form. Thus, in this manner, a feeding back of the electrical energy, which occurs due to excessive voltages, to the feed point 53 of the push-pull current transformer takes place so that the additional circuit operates practically free of power-loss. Due to the fact that the push-pull winding 50 can easily be dimensioned by controlling the number of its windings so that the occurring voltage corresponds to the center feed voltage occurring at the feed point 53, a voltage limitation to this value will take place since all voltages which exceed this center voltage are rendered harmless by the additional circuitry.

FIG. 3 illustrates a further exemplary embodiment A2 of the invention to be substituted for the circuit A in FIG. 1. Here the additional secondary winding 50 (FIG. 2) for the push-pull transformer 43 (FIG. 1) is not needed. Instead, taps 54 and 55 are provided on the primary winding 41 on opposite sides of the center tap connected to the feed point 53. Diodes 48 and 49 are directly connected to the taps and are reversed from the orientation in FIG. 2. The taps 54 and 55 are placed so that the voltage occuring at them, in relationship to the feed point 53 of the push-pull current transformer, corresponds to the center feed voltage. Furthermore here the series connection of the capacitor 51 and the impedance coil 52 is provided so that the capacitor 51 is connected to the feed point 53. The remaining elements correspond, like in the exemplary embodiment illustrated in FIG. 2, with the circuit illustrated in FIG. 1, namely the push-pull current transformer 4 (FIG. 1) has a primary winding 41, which feeds two switching transistors 44 and 45, which in turn are switched active in push-pull by a control circuit 46. The inductor 3 is connected to the feed point 53 and is supplied electrical energy from the transistor 2 which is not illustrated in FIG. 3.

If in the exemplary embodiment shown in FIG. 3 an excessive voltage occurs which surpasses the center feed voltage which can be caused by the aforedescribed actions of the stray inductivity of the push-pull transformer during switching over of the switching transistors 44 and 45, then a pulsating d.c. current occurs through the diodes 48 and 49 through the capacitor 51, which is smoothened in connection with the impedance coil 52 and is returned to the feed point 53.

Although particular preferred embodiments of the invention have been disclosed for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a circuit for the production of an output voltage depending on an input direct voltage and a given desired voltage having a series connection comprising a longitudinal regulating member, an inductor and a push-pull current transformer which produces said output voltage and which is fed with said input direct voltage, said inductor and said push-pull current transformer being connected in parallel with a diode which becomes loaded at inductive cut-off voltages in the pass direction, the improvement comprising wherein said push-pull current transformer has a series connection of an impedance coil and a capacitor connected in parallel therewith and a pair of diodes symmetrically connected to said push-pull transformer at the one ends thereof and to each other and a connecting point between said impedance coil and said capacitor at the other ends thereof whereby voltages which are derived symmetrically from said push-pull transformer are conducted each through at least one of said pair of diodes to said capacitor.

2. The improved circuit according to claim 1, wherein said push-pull transformer includes an additional push-pull winding in a fixed coupling, the ends of which are connected through said diodes to said connecting point.

3. The improved circuit according to claim 2, wherein said impedance coil is connected to a junction point between said inductor and said push-pull transformer.

4. The improved circuit according to claim 1, wherein said push-pull transformer includes switching means; and
wherein said push-pull transformer includes a primary winding having taps thereon, each being connected through said diodes to said connecting point between said capacitor and said impedance coil.

5. The improved circuit according to claim 1, wherein said push-pull transformer includes a primary winding having a center tap thereon; and
wherein a selective number of turns in said primary winding produces a desired relationship between the voltage at said center tap of said push-pull transformer and a given voltage superelevation which is caused during a switching off of said switching means.

* * * * *

UNITED STATES PATENT AND TRADEMARK OFFICE
CERTIFICATE OF CORRECTION

PATENT NO. : 4 100 595
DATED : July 11, 1978
INVENTOR(S) : Werner Pollmeier

It is certified that error appears in the above-identified patent and that said Letters Patent are hereby corrected as shown below:

Change spelling of assignee "Nisdorf" to ---Nixdorf---.

Signed and Sealed this

Third Day of April 1979

[SEAL]

Attest:

RUTH C. MASON
Attesting Officer

DONALD W. BANNER
Commissioner of Patents and Trademarks